2 Sheets—Sheet 1.
9250X
H. BURDEN.
MAKING HORSESHOES.
Patented Nov. 23, 1835.
No. 2. Fig. 1.
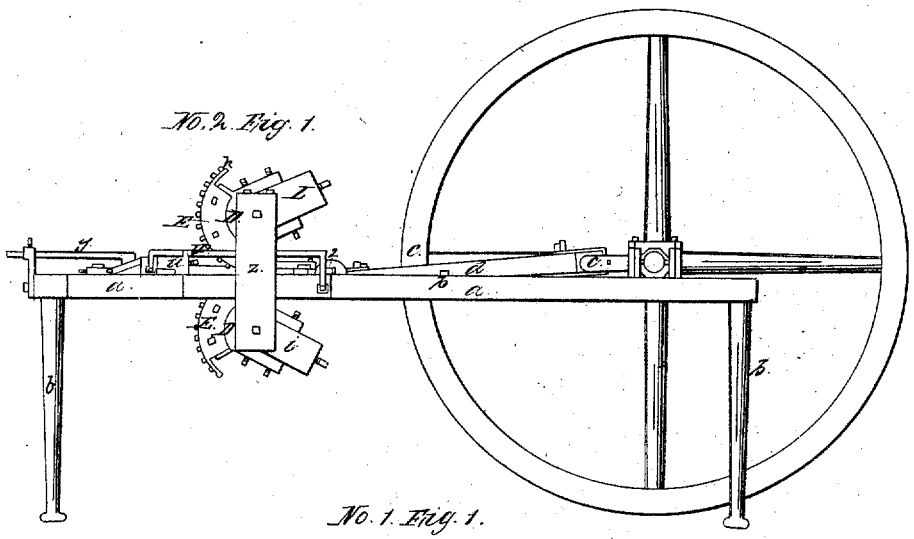
No. 1. Fig. 1.
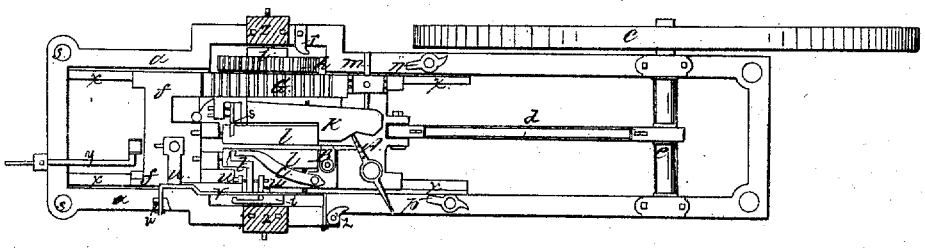
No. 1. Fig. 2.
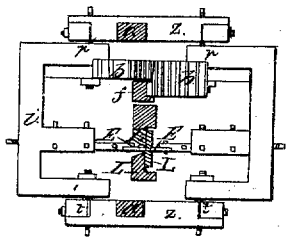
No. 2. Fig. 2.
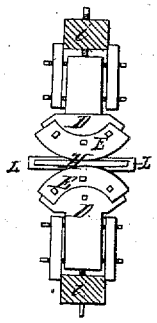
No. 2. Fig. 3.
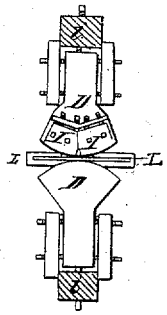
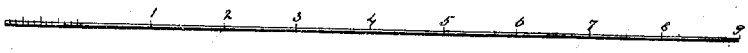

9250X
H. BURDEN.
MAKING HORSESHOES.
Patented Nov. 23, 1835.
No 3. Fig. 1.
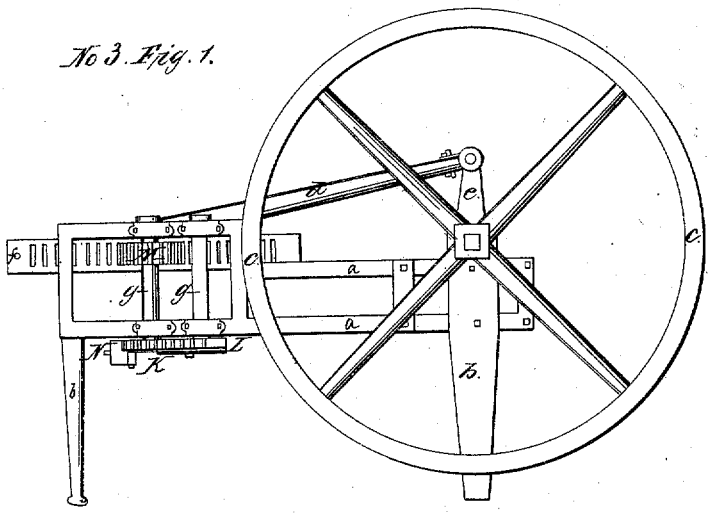
No 3. Fig. 3.
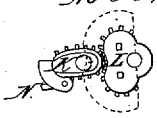
No 3. Fig. 2.
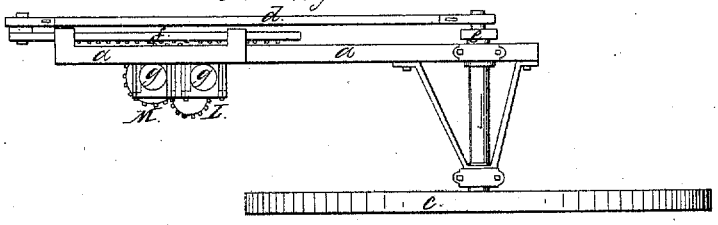

Henry Burden
Letters Patent

9250X

The schedule referred to in these Letters Patent and making part of the same, containing a description in the words of the said Henry Burden himself of his Improvement in the Machine for making Horse Shoes.

Be it known that I, Henry Burden of the City of Troy, County of Rensselaer, and State of New York, hath invented new and useful machinery for the purpose of making Horse Shoes. Do hereby declare the nature of my said invention, and the manner in which the same is to be carried into effect are fully described and ascertained in and by the following descriptions thereof reference being had to the drawings hereunto annexed, and to the figures and letters marked therein (That is to say—

Sheet No 1. Fig. 1. Section & Birdseye View of the machine for rolling, drawing or Shaping Horse Shoes; a, a, a, a, Stationary or outside frame, b, b, b, b, feet which supports the same; c. The fly wheel. d, the connecting rod. e, the crank, f, f, the moving frame; g. the rack, having cogs in it which is bolted into the moving frame and which mashes or fits into the segment h having long cogs as seen at h; — Fig. 2. h. the lower or under segment which is fastened into the roller i, as seen at i, Fig. 2, i.i, end view of rollers as seen at i.i, — Fig. 2. — k the moving jaw. ll. the sides steels or irons, between which the piece of iron is confined on the sides, while it is drawn or rolled by the swedges D.D, having steels or swedges E. E. the exact thickness of the shoe intended. — It will be observed that one of these side steels or irons is fastened into the moving jaw k, by means of screw bolts, while the other is similarly fastened into the moving frame f.f. — m, a button or cam which when the moving frame ff is moved or drawn backwards and forwards by the

9250X crank c through the connecting rod d. it strikes against the pinion stop w. which permits the button or cam o. to push back or open the moving jaw k. when it strikes against the pin or stop P. on the other side of the stationary frame by which means the piece of iron which may be between the side steels or irons and which is drawn or rolled to the shape desired is permitted to drop out. Q, A pin or stop which when the cam O, strikes against it on the moving frames return motion, permits the cam m. when it strikes against the pin or stop r, to close the moving jaw k – It will be observed that when the moving frame ff. has performed its forward motion, the cam m. strikes against the stop n. which permits the cam o, to open the moving jaw k, by striking against the stop P, which allows the piece of iron which may have been rolled or shaped to a horse shoe to drop from between the side steels or irons l.l. – S. A chisel fastened by screw bolts on the top of the side steel or iron l – t – A chisel fastened by screw bolts in the chisel box u.u.u.. It will be observed that the box u,u,u. turns on a pin in the moving frame which when the crank pushes back the moving frame the head or box part strikes against the pin or piece of iron w, and presses up the chisel t. against the chisel S, and cuts off the piece of iron to the length intended for a horse shoe. – V. A piece of iron intended to draw back the chisel box u,u,u, as seen at sheet No 2.

Fig 1 – x,x,x,x, brasses on which the moving frame slides backwards and forwards. Y, A piece of iron to lay the bar on as a guide while in the act of feeding into the machine.

Z,Z, End view and section of the posts through which the Rollers i.i. are fastened and revolve. A, piece of iron or stop which graduates the length of shoe – B, piece of iron having a hole in it through which the iron or stop A, passes, which graduates the length of shoe C. The piece of iron which prevents the shoe from being drawn back by the chisel on the side steel l, previous to the swedges pressing it between them.

Fig. 2. Section & Elevation of said Machine for drawing, rolling or shaping Horse shoes — h, segments which are fastened into the rollers i. i. ⊗ G, the rack which makes or works into the upper segment, — h, the cogs of which being twice the length of the under segment h, permits the rack to operate into it, which when pushed backwards and forwards by the moving frame f f, the whole is put in motion. i i, The rollers into which the segments with cogs h h, and swedges D, D, with pieces, or swedges E, E, are fastened. k, the moving jaw, l l, The side steels or irons between which the piece of iron is held, while it is rolled or drawn by the vertical swedges D, D, and steels or swedges E, E, to the desired shape of shoe. It will be perceived that the rollers i, i, revolve on gudgeons or centers F, F, F, F. Z, Z, posts or stationary frame into which the rollers i, i, are fastened and revolve.

Sheet No. 2, Fig. 1. Elevation of Machine for rolling, drawing, or shaping Horse shoes — a, a, the stationary or outer frame, b, b, the feet which supports the same — c, c, the fly wheel. d, the connecting rod. e, the crank which gives motion to the Machine, as seen at No 1. Fig 1 — h, h, segments of a circle fastened into the rollers i, i, as seen at No 1. Fig. 2d, i, i, the rollers in which are fastened the segments h, h, and swedges D, D, with the pieces of steel or swedges E, E, which rolls or tapers the piece of iron intended for a horse shoe, as seen at E, E, D, D, No. 1. Fig. 2, n, n, Box which contains the chisel, which cuts off the piece of iron intended for the shoe. V, A piece of iron which is intended to draw back the chisel or cutter Box as it passes along by means of a pin G, fastened into said chisel or cutter box, as seen at V, No. 1, Fig. 1. Y, A piece of iron or guide to lay the bar on while in the act of cutting into lengths for horse shoes. p, a pin or stop fastened into the stationary frame against which the button or cam O strikes, as seen at O, No. 1, Fig. 1. Q, A pin fastened into the stationary frame, against which the button

9250X or cam Q strikes, as seen at No 1. Fig 1. Z, the post into & through
which the roller gudgeon pass an revolve.
Q Fig. 2, Section and Elevation of Machine for rolling, drawing, or Shaping
Horse Shoes – i,i, The rollers in which the swedges with the pieces of steel
or swedges E.E. are fastened. L.L. One of the side steels or irons – H, repre-
sents a piece of iron as being formed into a horse shoe. It will be
readily perceived that by grinding the steels or swedges E,E, any shape
or taper required can be given to the piece, or iron, or shoe marked
H. – It will be observed the four views or figures as above described
represents the part or parts of Machinery for cutting off, rolling,
or drawing the iron into the shape required for horse shoes, and
that Fig. 1, No. 1, is a section having the upper roller i, removed
for the purpose of showing more distinctly the interior arrangements
of the Machine.
Fig. 3, Section & Elevation of Machine for grooving and punching
horse shoes. i,i, The rollers. D,D, the swedges, the under one which
is cast iron, or may be fitted with steel swedge, similar to those
used for rolling or shaping the shoe as seen at D,D. E,E, – Fig 2, of
No. 2, the edge of which being similar to the flat side of a horse
shoe; the upper one is also cast iron, so constructed as to fasten in
two pieces of steel under the covers or caps i,i. These pieces of
steel are so shaped on their edges as to groove and punch the holes at
one operation. They are also graduated as to depth by the four screws
which passes through the flanch above, l,l, One of the side steels.
H, represents a horse shoe in the act of being grooved and punched.
The Machine for grooving and punching is precisely the same
as the one for rolling or drawing the shoe to the required shape
with the exception of the upper swedge, as described above.
Sheet No. 3. Fig. 1, Elevation of Machine for Bending Horse Shoes.
a, a, a, the frame. b,b, the feet which supports the same, c,c, the
fly wheel, d, the connecting rod, E, the crank shaft, f,f, the rock.
g,g, the two shafts. K, the piece of iron around which the shoe is bent,

[illegible]ing cogs on its edges shaped so as to fit and mash into the piece K, while they revolve round on their respective shafts g.g. M the wheel which mashes and fits into the rack f.f. and which communicates motion to the shafts g.g. and pieces of iron K & L. N a button or nipper which takes hold of the end of the horse shoe in consequence of its coming into contact with the piece of iron L, and holds it fast while it is in the act of bending, and when bent said button or nipper strikes against the other side of the piece L, which opens and lets the shoe drop. It will be observed that the shafts g.g. and pieces of iron K & L. does not make a full revolution.

Fig. 2, Plan or birdseye view of Machine for bending Horse shoes. a,a, the frame. b the fly wheel. c the crank shaft. d the connecting rod. f, a rack. g,g, two shafts, as seen at fig. 1. M, a wheel whose cogs mashes or fits into the cogs of the rack f. L, the eccentric piece of iron which fits into the piece K, on which the shoe is formed as seen at Figure 1 & 3. O cap which confines the piece of iron, while in the act of bending around the piece K, as represented by the dotted lines at Fig. 3.

Fig. 3, Section of the Machine for bending horse shoes. K, a piece of cast or other iron, shaped like a horse shoe, the upper side of which having cogs placed on it. This piece is fastened to the shaft g. as also the wheel K, which mashes into the rack f. L, another piece of cast or other iron fastened on the other shaft g, so shaped with cogs on the edges, as to fit exactly into the cogs K. These two pieces K & L, are fastened on the shafts g.g. with their reversed sides up from what they appear on the drawing. The dotted lines + represents a cap which is fastened on the piece of iron L with seven bolts. This cap is about one inch thick, and serves the purpose of keeping the iron close up while in the operation of bending around the piece of iron K.

Having described the drawings, I shall now proceed to explain

9250X the nature of the operation. And firstly — (Sheet No. 1. fig. 1) represents a section or birdseye view of the Machine, having the upper roller i, removed, as seen at i, Fig. 2, so as to show more distinctly the interior arrangement of the Machine. Supposing a pulley of about 4 feet diameter were bolted to the arms of the fly wheel c (which I omitted to show on the drawing) and to which motion were communicated by a leather strap or belt from a corresponding pulley on a shaft connected with a water-wheel or other power; It is evident that every revolution of the fly wheel c, would move the carriage or moving frame f.f. backwards and forwards, giving motion to the different parts of the Machine as described and shown by the two figures of the above named sheet. And supposing the crank e,e, by the connecting rod d, had pulled or drawn the moving frame ff, forward so as to cause the button or cam m, to strike against the stop n, the cam o would also strike against the stop P. and consequently push back or open the moving jaw k, which turns on a pivot at the other end. And supposing the moving frame f.f. were pushed back on the scapes X, X, and towards the last part of the motion a hot piece of iron (previously rolled to the desired size) were introduced between the side steels or irons l, l, it is evident that the cutter hop u,u,u, would strike against the stop W and press up the chisel t against the chisel S, cutting of the necessary length of iron to make the shoe, and should the moving frame be drawn forward by the crank e the piece of iron being confined by the side steels or irons l,l, on the sides would be rolled or shaped by the vertical steels or swedges E,E, as seen at Fig 2, when the cam m would strike against the stop n, and permit the cam O to open the jaw k, and let the piece drop — The appearance and shape of which may be seen as represented by H, Fig 2. Sheet No. 2. I would remark that the drawing represents the machine as fitted to receive the iron (previously rolled) flat, a little thinner on one edge than the other and the steels or swedges E, E, (Fig. 2. Sheet No 2) are so ground or shaped as to roll or taper the piece H, at each end intended for the heels of the shoe but I find by experiment that using the iron square and so grinding the steel or swedges E, E, as to flatten or roll down the middle of the piece leaving the ends square for the heels of the shoe makes the best shoe.

Secondly having explained the process of cutting the bar or rod, into suitable lengths and rolling or shaping the same suitable for horse shoes, I shall now proceed to describe the manner of grooving and punching them. And having already stated that the machine for grooving and punching is precisely the same as the one above described for rolling or shaping the shoe with the exception of the upper swedge which is substituted by the swedge represented in sheet No. 2. Fig. 3. Supposing a machine every way similar to the one for rolling or shaping the shoe as described ~~as described~~ under the first head with the exception of the upper swedge in lieu of which the one represented by sheet No. 2. Fig. 3. was substituted the piece of iron which came from the first machine were introduced between the side steels or irons L, L, and the machine set in motion it is evident it would be grooved & punched, and drop out of the machine on the moving jaw K, being opened in the same manner as the piece dropped out from the first machine, as described under the first head.

Thirdly having described the manner in which the piece is grooved & punched, I shall now attempt to show how it is bent, which is the last operation. The piece of iron being now rolled or shaped, as may be desired, for a Horse Shoe, as also grooved and punched, is introduced into

9250X the machine, as shown and described by sheet No 3. –
for a complete understanding of the operation of bending,
see Figures 1, 2, and 3 of said sheet with the descriptions
thereof. Believing that the three sheets of drawings together
with the description thereof is sufficient to enable any person
at all conversant with mechanics to construct and operate
my horse shoe machines. I shall now proceed to claim what
1 I consider new and invented by me and First; I claim the machine
for rolling, drawing, or shaping horse shoes, as described and
represented by the two sheets of Drawings No^s 1 and 2. as a
whole as there arranged. Namely those parts called side
steels or irons l, l, which confines the piece of iron intended
for a horse shoe on the sides while it is rolled or shaped by the
vertical swedges E, E. I also claim the vibrating or recipro-
2 cating motion of moving frame ff, which gives motion to
all the other parts of the machine, which enables the operator
to feed up the iron intended for Horse shoes to the stop A,
cutting it off accurately, and rolling or shaping them at the
same time.

And I wish it expressly understood, that I claim
the above named reciprocating motion, whether it be by
side steels and swedges as above named or whether it be
merely a pair of common grooved rollers the one having
a groove or channel turned or cut the shape of the shoe, the
other having a tongue so shaped as to fit the groove exactly,
the periphery of said tongue being so shaped as to roll the shoe
thinner at some part than others, as may be desired.
It will be observed that if two rollers as above named were
connected together at the end by two pinions and on the other
end of one were fastened a wheel (similar to the wheel M on one of
the shafts g of the bending machine, as seen at Sheet No 3.
Fig. 1, having a rack operating into said wheel connected to a crank in every respect similar to the bending machine, it
is evident that said rollers would move backward & forward
making such part of a revolution as the length of the crank might
give them. I therefore claim said reciprocating motion when applied
to rolling or shaping horse shoes by rollers. I do not claim the use
of solid rollers in rolling horse shoes, for I believe this has been done,
or rather attempted to be done, which has universally proved a
failure in consequence of not having reciprocating motion to enable
the operator to feed up the iron to a stop so as to ensure the piece of
iron intended for a horse shoe, being always in the proper place to
the impression from the rollers.

Another reason why rolling horse shoes by solid rollers has
failed, is that the tongue of the one and socket of the other, are
liable to wear, consequently have to be laid aside, whereas my
method of having the tongue or swedges, as also the socket divided
into sections, which allows the whole being ground, repaired and
moved at pleasure by screws so as to ensure the sides of the socket
fitting close to the tongue, as also having one side of the socket
moveable to allow the shoes being discharged. I also claim the 3-
method of having those parts of the machine, which confine
the iron on the sides represented as side steels, marked L.L.
moveable so as to permit their being ground (when worn)
at the same time moving them close up to the swedges C.C. by screws.
I also claim the plan of making the rollers i.e. sheet No. 1 Fig. 2.
with an open mortice so as to prevent the swedges D.D. being moved.
In fine, I claim the method of dividing the working parts which
roll or shape the shoe into such section as enables me to grind,
replace or move them at pleasure, in lieu of solid rollers, which
when worn has to be laid aside altogether. I wish it particularly
understood, that I do not confine myself to the precise method
of operating the machine for rolling or shaping Horse Shoes as
represented by the drawings hereunto annexed as in lieu of the frame

9250X f.f. being moved it may be made stationary, and the rollers i, i moved backwards & forwards in slides, with corresponding movements given to the other parts, which would produce analogous results.

Secondly, I claim the machine for grooving & punching Horse Shoes, as represented by the drawings, and description thereof. That is to say, I claim the manner for confining the piece of iron intended for a horse shoe between the side steels l.l. while in the act of grooving and punching by the upper swedge D, having the pieces of steel fastened under the caps i, i. I also claim the vibrating or reciprocating motion of the machine in grooving and punching, for the same reasons as set forth in my claim to the machine for rolling or shaping.

I wish it understood, I do not claim the rolling a plain groove or channel along the one edge or side of a bar of iron intended for horse shoes, for I believe this has been done, but I do claim the manner of so shaping the edge of the steels as to leave projection for the head of the nails, as in all cases even when made by hand the groove is first made then the holes but my plan I make both at once, which serves the double purpose of adding strength to the punches by being formed on and composing part of the steel which forms the groove or channel, as also performing both operations at once. I also claim the method of fastening the two pieces of steel which grooves and punches the shoe under the caps i, i, which permits their being screwed down by the four screws when necessary, in consequence of their becoming short by filing or other causes. And as I deem the discovery of forming the projections or punches on the same piece of steel, which grooves or channels the shoes of great importance, I shall describe the manner in which it is done. I take a piece of cast or other steel previously rolled or hammered to at about one fourth of an inch in thickness, about four inches wide, and as long as necessary to form the groove on one side of the shoe. I then grind or reduce the edge by a file to the proper shape to form the groove, then mark off where I want the projections or punches, filing down the spaces between the projection so as to give them sufficient length to form the holes, which adds great strength to the punches compared with the method of inserting small pieces of steel into a roller to form punches as has been proposed, although I believe never carried into effect from its impractibility.

Thirdly. I claim the Machine for bending horse shoes as represented and described by the drawings thereof in every particular as there arranged. And in addition to which I claim any other Method of bending horse shoes so long as the piece is taken hold of by one end, while the other is bent round the mould; no matter whether the mould revolve round or is stationary, and the piece of iron is pulled or bent round it.

I also claim in a particular manner the placing .. the face of the mould downwards so as to permit the shoe to drop or discharge itself. I wish it also expressly understood that I claim the using a piece of flat iron, as represented by the dotted lines, (see sheet No. 3. Fig. 3) for the purpose of keeping the shoe close up to the mould while in the act of bending. I also claim the Nipper or Button I (see sheet No. 3, Fig. 3) which closes and holds fast the end of the Horse Shoe by striking against the piece L, while in the act of bending round the shoe shape K, and which opens in consequence of its coming in contact with the other side of the piece L, and lets the shoe drop.

I also claim the manner of making the gearing or wheels connected with the pieces of iron K & L excentrick or so shaped as to have the pitched line describe the same circle as the shoe otherwise the shoe would not be on irregular.

It will be observed that although the gearing is by no means round nevertheless it operates accurately while they revolve round on their respective shafts.

In witness whereof I hereunto subscribe my name this third day of October 1835.

Witnesses Henry Burden

Ch. M. Davis

Jn. Cushman.

(Drawing)

(4771 words)